United States Patent
Faruque et al.

(10) Patent No.: US 11,021,122 B1
(45) Date of Patent: Jun. 1, 2021

(54) VEHICLE CRUSH-CAN ASSEMBLY AND CRUSH-CAN ASSEMBLY PROVIDING METHOD

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 16/690,822

(22) Filed: Nov. 21, 2019

(51) Int. Cl.
*B60R 19/34* (2006.01)
*B33Y 80/00* (2015.01)
*B60R 19/18* (2006.01)
*B33Y 10/00* (2015.01)

(52) U.S. Cl.
CPC .............. *B60R 19/34* (2013.01); *B33Y 80/00* (2014.12); *B60R 19/18* (2013.01); *B33Y 10/00* (2014.12)

(58) Field of Classification Search
CPC ......... B60R 19/34; B60R 19/18; B33Y 80/00; B33Y 10/00

USPC .......................................................... 293/133
See application file for complete search history.

(56) References Cited

U.S. PATENT DOCUMENTS

| 7,918,493 B2* | 4/2011 | Nishiguchi | B60R 19/34 296/187.09 |
| 9,630,582 B1* | 4/2017 | Faruque | F16F 7/122 |
| 2010/0032970 A1* | 2/2010 | Nishiguchi | F16F 7/12 293/132 |
| 2012/0112479 A1* | 5/2012 | Nagwanshi | F16F 7/121 293/133 |
| 2013/0175128 A1 | 7/2013 | Kumar et al. | |

FOREIGN PATENT DOCUMENTS

| CN | 103287369 A | 9/2013 |
| CN | 107985237 A | 5/2018 |
| DE | 102015000031 A1 | 9/2015 |
| GB | 2308100 A | 6/1997 |

* cited by examiner

*Primary Examiner* — Pinel E Romain
(74) *Attorney, Agent, or Firm* — David Coppiellie, Esq.; Carlson, Gaskey & Olds, P.C.

(57) ABSTRACT

A vehicle system includes, among other things, a crush-can assembly having an inner member received within an outer member. The inner and outer members both additively fabricated. The outer and inner members configured to be positioned between a bumper beam and a vehicle frame.

18 Claims, 6 Drawing Sheets

VEHICLE CRUSH-CAN ASSEMBLY AND CRUSH-CAN ASSEMBLY PROVIDING METHOD

TECHNICAL FIELD

This disclosure relates generally to a crush-can assembly for a motor vehicle and a method of providing a crush-can assembly. In particular, the disclosure relates to an additively fabricated crush-can assembly having a nested design.

BACKGROUND

Vehicles are known to include front and rear bumpers, which are structures that are attached to or integrated with the front and rear ends of the vehicle, respectively, and configured to absorb impact loads. Crush-can assemblies can couple the bumpers to the vehicle frame. The crush-can assemblies can absorb loads applied to the bumper.

SUMMARY

A vehicle system according to an exemplary aspect of the present disclosure includes, among other things, a crush-can assembly having an inner member received within an outer member. The inner and outer members both additively fabricated. The outer and inner members are configured to be positioned between a bumper beam and a vehicle frame.

Another example of the foregoing vehicle system includes the bumper beam attached to a first end portion of the crush-can assembly, and the vehicle frame attached to a second end portion of the crush-can assembly. The first end portion is opposite the second end portion.

Another example of any of the foregoing vehicle assemblies includes a support plate of the crush-can assembly. The support plate is additively fabricated. The support plate extends from the second end portion of the outer member. The support plate is directly connected to the vehicle frame to attach the crush-can assembly to the vehicle frame.

Another example of any of the foregoing vehicle assemblies includes mechanical fasteners that directly connect the support plate to the vehicle frame.

In another example of any of the foregoing vehicle assemblies, the inner member and the outer member each have a circular axial cross-section.

Another example of any of the foregoing vehicle assemblies includes a plurality of flanges of the crush-can. The plurality of flanges are distributed circumferentially about a longitudinal axis of the crush-can. Each of the flanges in the plurality of flanges extends radially from the inner member to the outer member.

In another example of any of the foregoing vehicle assemblies, the inner member extends longitudinally a first distance and the outer member extends longitudinally a second distance that is greater than the first distance.

In another example of any of the foregoing vehicle assemblies, the inner member is a first inner member. The assembly further includes a second inner member of the crush-can assembly. The second inner member is received within the first inner member.

Another example of any of the foregoing vehicle assemblies includes the second inner member extending longitudinally a distance less than the first inner member. The first inner member extends longitudinally a distance less than the outer member.

Another example of any of the foregoing vehicle assemblies includes an additively fabricated lattice structure disposed between the inner member and the outer member.

A crush-can assembly providing method according to another exemplary aspect of the present disclosure includes using an additive fabrication process to provide a crush-can assembly having an inner member received within an outer member. The outer and inner members are configured to be positioned between a bumper beam and a vehicle frame.

Another example of the foregoing method includes attaching a first end portion of the crush-can assembly to a bumper beam of a vehicle, and attaching a second end portion of the crush-can assembly to a vehicle frame of the vehicle.

Another example of any of the foregoing methods includes directly connecting a support plate that extends from the second end portion of the outer member to the vehicle frame to directly connect the crush-can assembly to the vehicle frame.

In another example of any of the foregoing methods, the support plate is additively fabricated together with the outer and inner members.

Another example of any of the foregoing methods includes a plurality of flanges of the crush-can. The plurality of flanges are distributed circumferentially about a longitudinal axis of the crush-can. Each of the flanges in the plurality of flanges extends radially from the inner member to the outer member. The plurality of flanges are additively fabricated together with the inner and outer members.

In another example of any of the foregoing methods, the inner member extends longitudinally a first distance and the outer member extends longitudinally a second distance that is greater than the first distance.

In another example of any of the foregoing methods, the inner member and the outer member each have a circular axial cross-section.

In another example of any of the foregoing methods, the inner member is a first inner member, and a second inner member of the crush-can assembly is received within the first inner member.

In another example of any of the foregoing methods, the second inner member extends longitudinally a distance less than the first inner member. The first inner member extends longitudinally a distance less than the outer member.

Another example of any of the foregoing methods includes using the additive fabrication process to provide a lattice structure between the inner member and the outer member.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to crush-can assemblies of a vehicle. The crush-can assemblies can have nested members facilitating a progressive response to an applied load. The crush-can assemblies can be additively fabricated.

Figure 1:
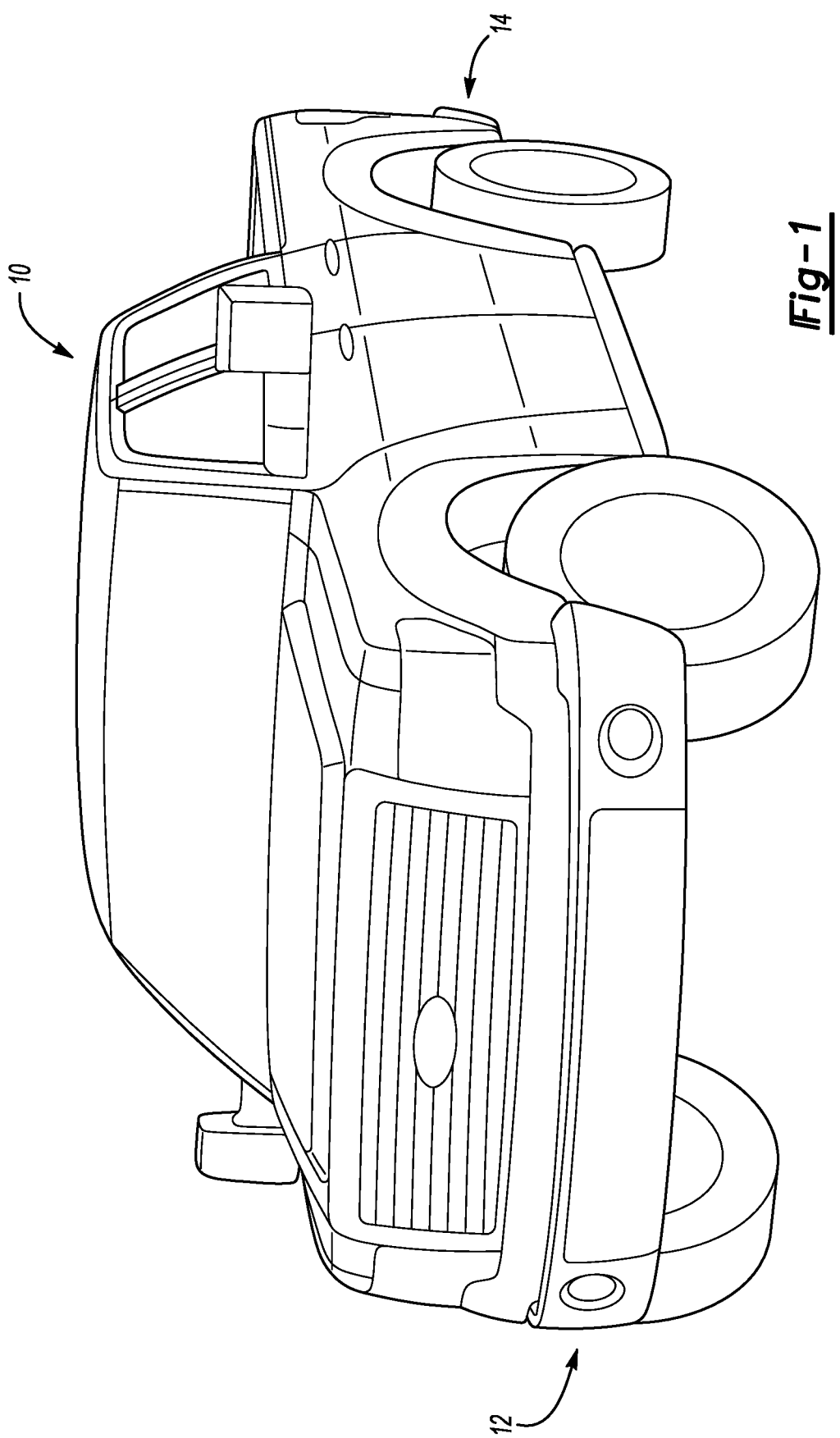
FIG. 1 illustrates a perspective view of a vehicle having a front bumper and a rear bumper.

FIG. 1 illustrates a motor vehicle 10, which, in this example, is a pickup truck. The vehicle 10 includes a front bumper 12 and a rear bumper 14.

Figure 2:
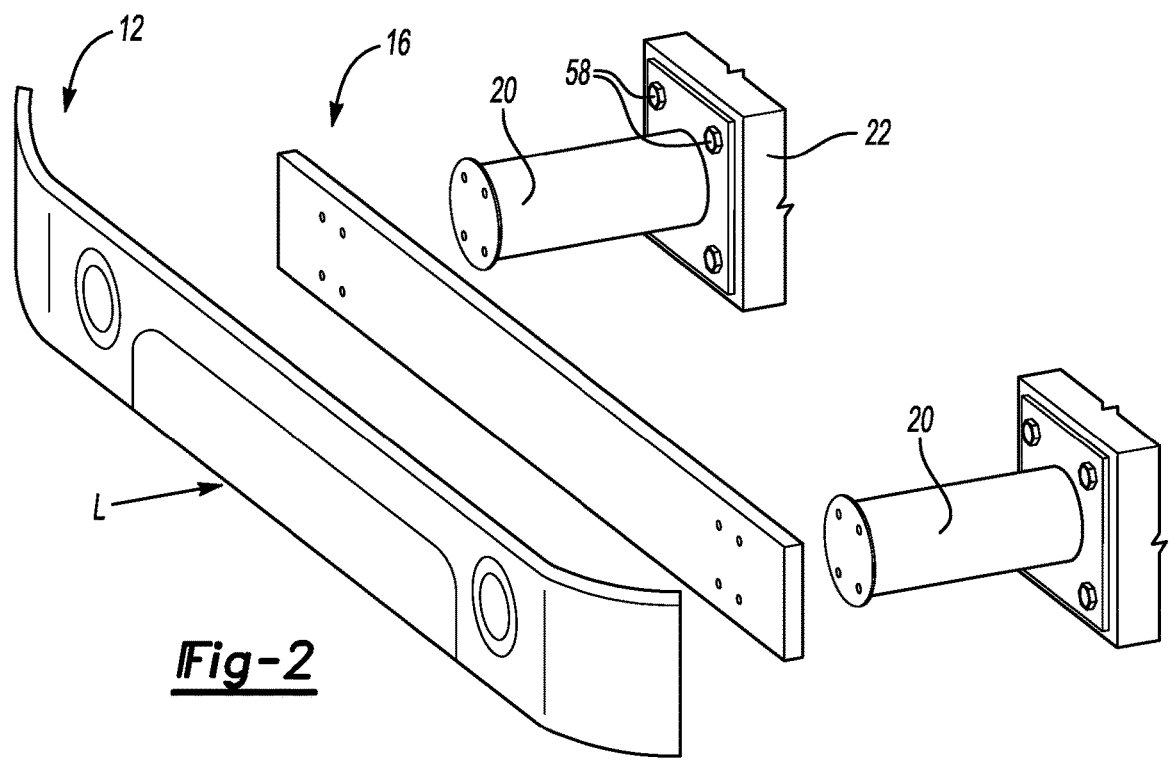
FIG. 2 illustrates an expanded view of the front bumper and other portions of the vehicle of FIG. 1.
Figure 3:
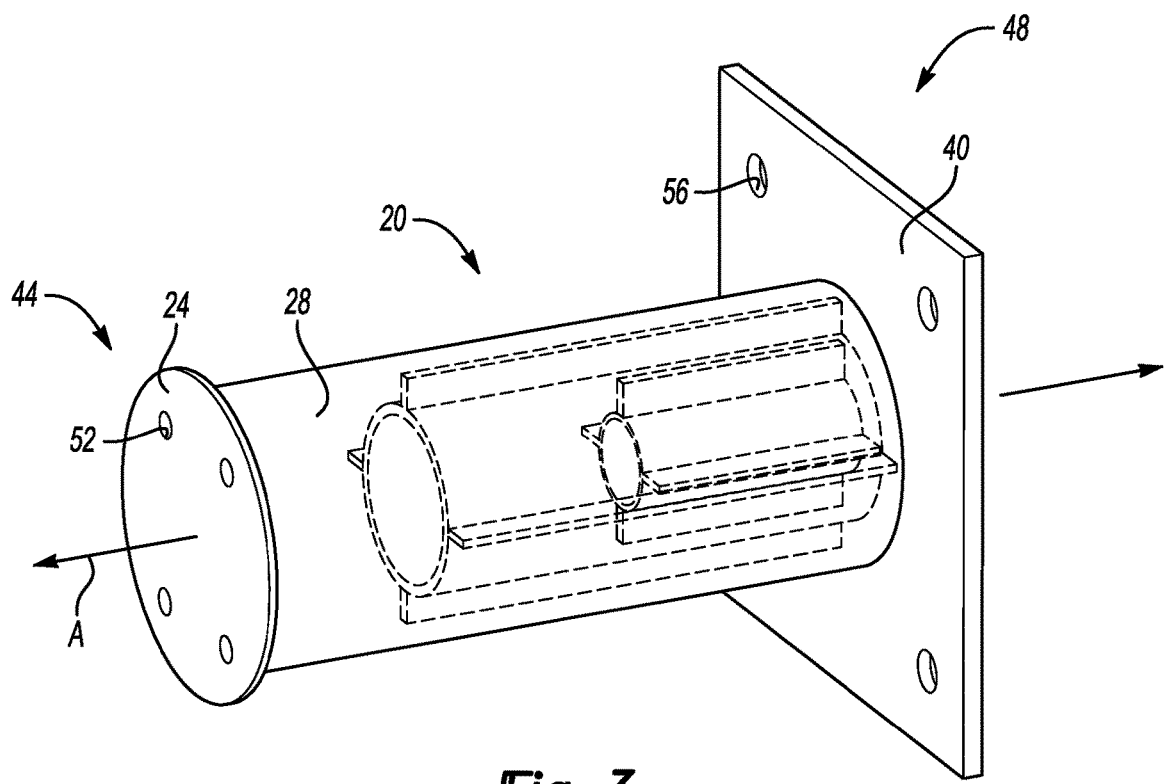
FIG. 3 illustrates a perspective view of a crush-can assembly used to support the front bumper of FIG. 2 according to an exemplary aspect of the present disclosure.
Figure 4:
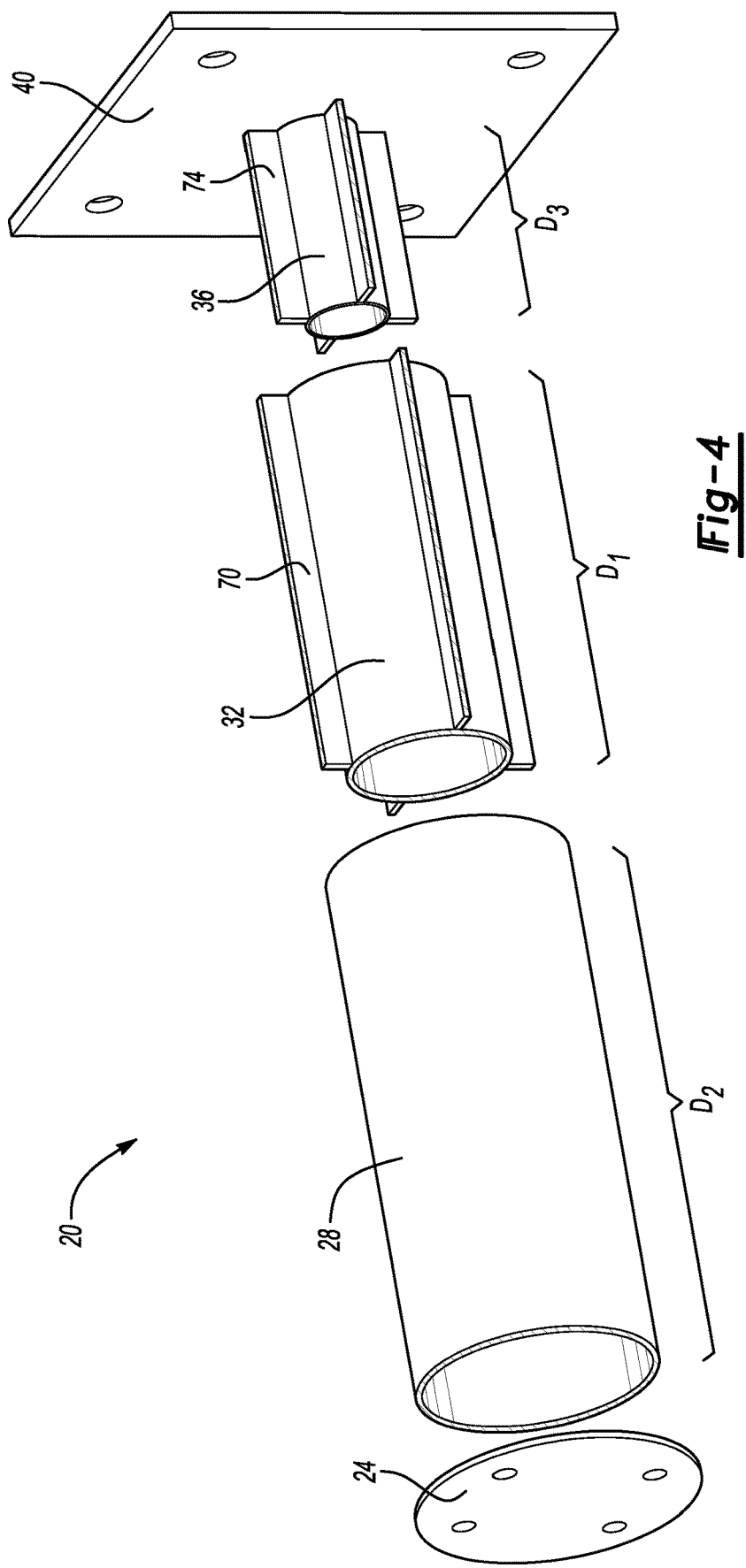
FIG. 4 illustrates an expanded view of portions of the crush-can assembly of FIG. 3.
Figure 5:
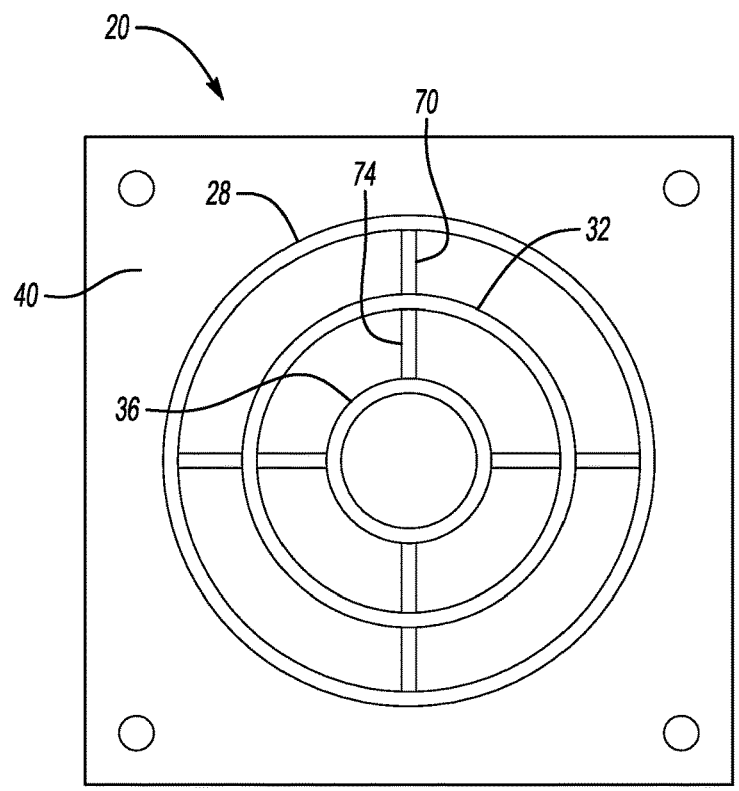
FIG. 5 illustrates an end view of portions of the crush-can assembly of FIG. 3.
Figure 6:
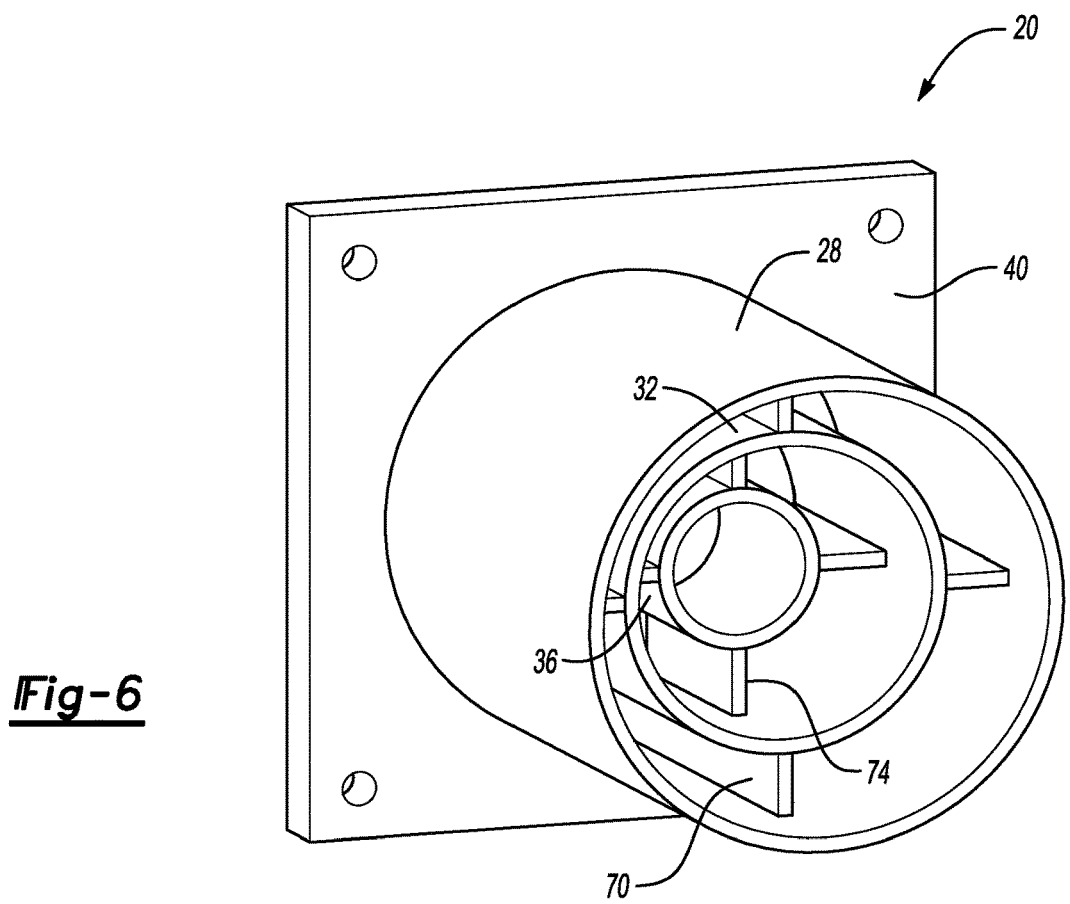
FIG. 6 illustrates a perspective view of portions of the crush-can assembly of FIG. 3.

FIG. 2 illustrates an expanded view of the front bumper 12. As shown, the front bumper 12 mounts to a bumper beam 16. Crush-can assemblies 20 secure the bumper beam 16 to respective portions of a vehicle frame 22. When an impact load L is applied to the front bumper 12, the crush-can assembly 20 can help to manage energy distribution associated with the load L. Other crush-can assemblies could be used elsewhere on the vehicle 10, such as in connection with the rear bumper 14.

Referring now to FIGS. 3-6 and continuing reference to FIG. 2, each of the crush-can assemblies 20 includes a mounting plate 24, an outer member 28, a first inner member 32, a second inner member 36, and a support plate 40. The outer member 28, the first inner member 32, and the second inner member 36 extend along a longitudinal axis A.

The mounting plate 24, the outer member 28, the first inner member 32, the second inner member 36, and the support plate 40 can be additively fabricated together as a singular monolithic unit. In other examples, some of these components of the crush-can assembly 20 are additively fabricated separately from each other, and are then secured to the remaining components. For example, the outer member 28, the first inner member 32, and the second inner member 36, and the support plate 40 could be additively manufactured together as a single unit. The mounting plate 24 can be fabricated separately and then secured to the outer member 28.

Additive fabrication, for purposes of this disclosure, refers a structure that is built by adding more and more layers of material. Additive fabrication includes 3D printing, rapid prototyping, direct digital manufacturing, layered manufacturing, and additive manufacturing.

In this example, the crush-can assembly 20 can be additively manufactured using a laser sintering process where each layer is approximately 50 microns.

A person having skill in the art would be able to structurally distinguish a structure that is additively fabricated from a structure that is not additively fabricated. A physical examination of the structure that is additively fabricated would reveal, for example, the various layers dipositive to provide the structure. The layers would indicated that the structure is an additively fabricated structure. Additively fabricated is thus a feature of a structure that structurally distinguishes that structure from other structure that are not additively fabricated.

The exemplary crush-can assembly 20 is additively fabricated from a metal, such as aluminum or steel. In other examples, the crush-can assembly 20 is additively fabricated from a metal alloy. Other materials could be used in other examples, such as a polymer based material.

The flexibility of additive fabrication can permit some material variation within the various areas of the crush-can assembly 20. For example, the first inner member 32 could be additively fabricated from a metal alloy having a first material composition, and the second inner member 36 additively fabricated of a metal alloy having a different second material composition.

The mounting plate 24 is disposed at a first end 44 of the crush-can assembly. The support plate 40 is disposed at an opposite, second longitudinal end 48 of the crush-can assembly 20. The mounting plate 24 can directly attach the crush-can assembly 20 to the bumper beam 16. In the exemplary embodiment, the mounting plate 24 includes a plurality of apertures 52 that receive mechanical fasteners used to secure the mounting plate 24 to the bumper beam 16. The mounting plate 24 could be welded to the bumper beam 16 in another example, or attached to the bumper beam 16 in some other way.

The support plate 40 extends radially outward from the outer member 28 relative to a longitudinal axis of the outer member 28. The support plate 40 attaches the crush-can assembly 20 to the vehicle frame 22. In the exemplary embodiment, the support plate 40 includes a plurality of apertures 56 that receive mechanical fasteners 58 (FIG. 2) to attach the crush-can assembly 20 to the vehicle frame 22.

The outer member 28, the first inner member 32, and the second inner member 36 are generally cylindrical. The second inner member 36 is received or nested within the first inner member 32. The second inner member 36 and the first inner member 32 are each received or nested within the outer member 28.

While the exemplary embodiment includes both the first inner member 32 and the second inner member 36, other examples could omit the second inner member 36 such that the crush-can assembly 20 includes only the first inner member 32.

In still other examples, additional inner members could be used, such as a third inner member that is received within the second inner member 36.

The first inner member extends longitudinally a distance $D_1$. The outer member 28 extends longitudinally a second distance $D_2$. The second distance $D_2$ is greater than the first distance $D_1$. Thus, when the crush-can assembly 20 is installed within the vehicle 10, the outer member 28 extends from the vehicle frame 22 closer to the bumper beam 16 than the first inner member 32.

The second inner member 36 extends longitudinally a third distance $D_3$, which is less than both the first distance $D_1$ and the second distance $D_2$. The crush-can assembly is thus considered to have a progressively nested-type design. The progressively nested-type design facilitates the crush-can assembly 20 accommodating and displacing in response to a wide range of forces.

Figure 7:
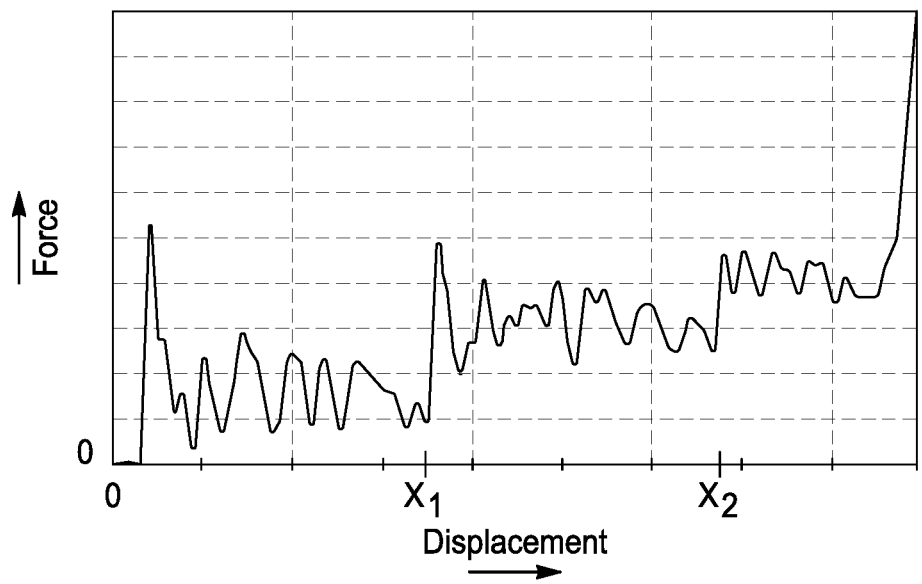
FIG. 7 graphically illustrates a force applied to the crush-can assembly of FIG. 3 versus deformation.

FIG. 7 graphically illustrates forces compared to displacement of the crush-can assembly 20 along the longitudinal axis. The displacement from 0 to $X_1$ corresponds to the compressing of the outer member 28 along the longitudinal axis as the bumper beam 16 moves closer to the vehicle frame 22 in response to the load L.

If the force associated with the load L increases and the displacement continues from $X_1$ to $X_2$, the first inner member 32 begins to compress in response to the load L. The resistive force provided by the crush-can assembly 20 increases due to the compressing of the first inner member 32 along with the outer member 28.

If the force associated with the load L increases and the displacement continues from $X_2$ and beyond, the second inner member 36 begins to compress in response to the load L. The resistive force provided by the crush-can assembly 20 increases again due to the compressing of the second inner member 36 along with the first inner member 32 and the outer member 28.

The distances $D_1$, $D_2$, and $D_3$ can be adjusted in response to CAE or physical tests to obtain a desired response to a load.

Vehicle mass can differ greatly among different vehicle body styles and even among different trim options. In the past, crush-can assemblies have included a relatively constant section along a longitudinal length of crush-can assemblies. The varied masses necessitated designing a specialized crush-can assemblies having a relatively constant section for each of the different options. A single crush-can assembly design having a relatively constant section could not be used in all the different vehicle body styles and trim options.

The crush-can assembly 20 of the exemplary embodiment can accommodate a range of different vehicle masses and effectively manage crush energy in a wide variety of vehicle designs and platforms. The crush-can assembly 20 can thus be incorporated into a wide variety of vehicle body styles and different trim options.

The crush-can assembly 20 includes features to maintain alignment of the outer member 28, the first inner member 32, and the second inner member 36 as the crush-can assembly 20 is compressed in response to the load L. In this example, the features include a plurality of flanges 70 and a plurality of flanges 74. The flanges 70 and 74 are distributed circumferentially about the longitudinal axis A. The plurality of flanges 70 each extend radially from the first inner member 32 to the outer member 28. The plurality of flanges 74 each extend radially from the second inner member 36 to the first inner member 32.

Figure 8:
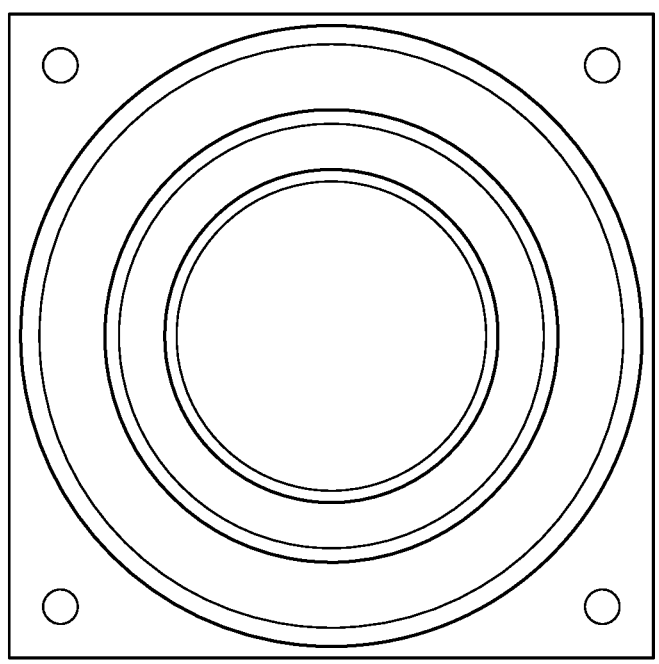
FIG. 8 illustrates an end view of portions of a crush-can assembly according to another exemplary embodiment.

In another example, the flanges 70 and 74 are eliminated, such as in the crush-can assembly 20A shown in FIG. 8.

Figure 9A:
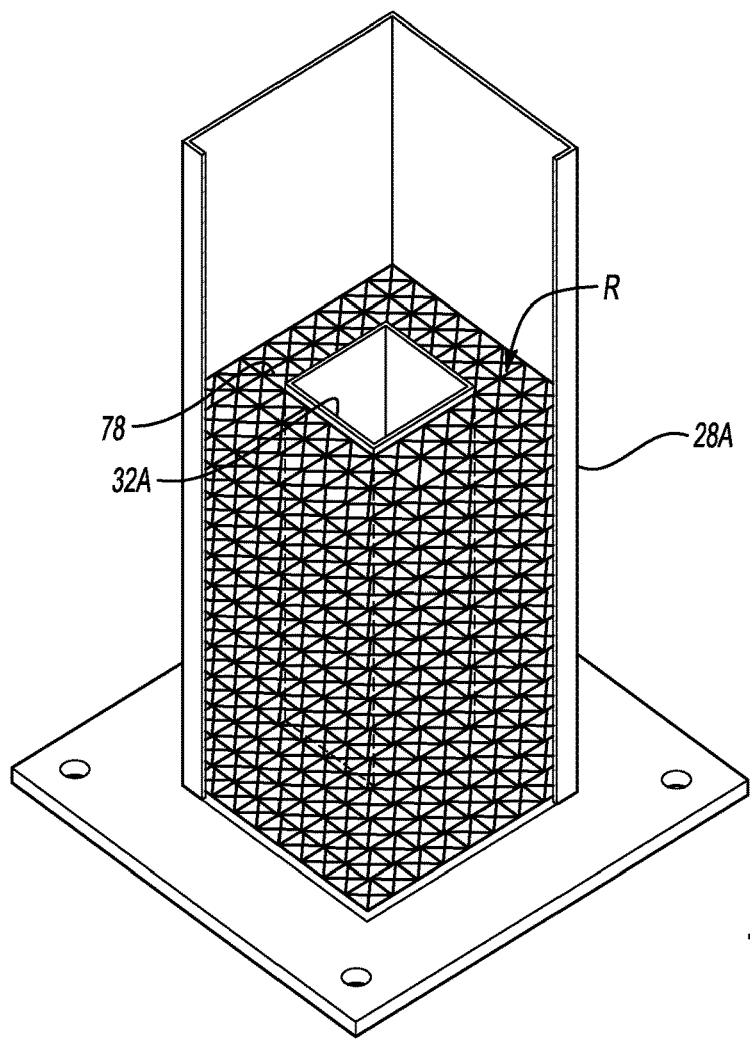
FIG. 9A illustrates a partial section view of a crush-can assembly according to yet another exemplary embodiment where the crush can assembly incorporates a lattice structure.
Figure 9B:
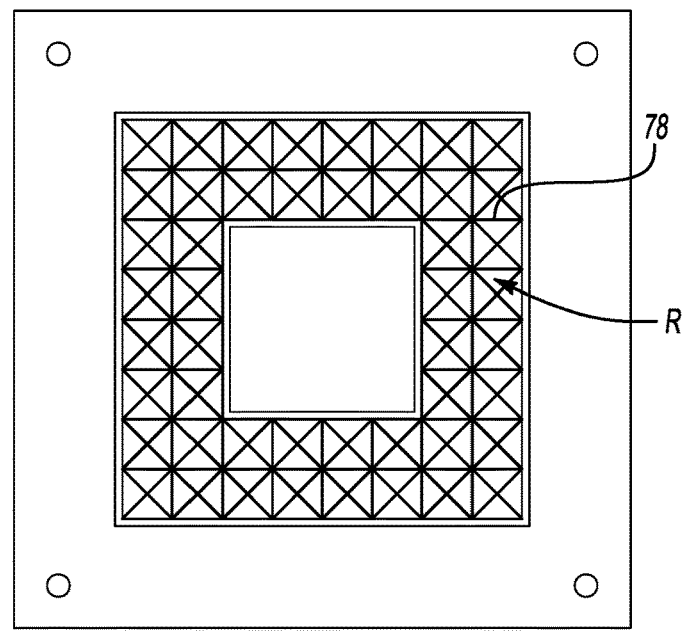
FIG. 9B illustrates a top view of the crush-can assembly of FIG. 9A.

Although the crush-can assembly 20 includes members having circular axial cross-sections, other cross-sections are possible and fall within the scope of this disclosure, such as the rectangular sections of the crush-can assembly 20B shown in FIGS. 9A-9C. Other exemplary axial cross-sections could include hexagonal and octagonal.

In the example embodiment of FIGS. 9A-9B, the regions R radially between an outer member 28A and an inner member 32A are filled with an additively fabricated lattice structure 78. The lattice structure 78 can facilitate keeping the outer member 28A and the inner member 32 aligned, especially when a load is applied to the crush-can assembly 20B. The lattice structure 78 could be used with any of the other exemplary embodiments of this disclosure. With reference to the embodiment of FIGS. 2-6, a lattice structure could be disposed radially between the outer member 28 and the inner member 32 instead of, or in addition to, the flanges 70. Another lattice structure could be disposed radially between the inner member 32 and the inner member 36 instead of, or in addition to, the flanges 74.

Features of the disclosed exemplary embodiments include a crush-can assembly that can accommodate a larger mass swings than the prior art crush-can assemblies having a relatively constant cross-section. The outer member of the crush-can assembly, in an example, can be designed for lower ranges of vehicle mass. The inner members nested within the outer member can be incorporated to cover higher ranges of vehicle mass.

Using casting or extrusion process to provide such a crush-can assembly could be complicated. Even if individual outer member and inner members could be cast, for example, assembling or welding together such members could be costly and time consuming process. Additive fabrication facilitates the providing of a crush-can assembly having an outer member and inner member nested within the inner member.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle system, comprising: a crush-can assembly having an inner member received within an outer member, the inner and outer members both additively fabricated, the outer and inner members configured to be positioned between a bumper beam and a vehicle frame, wherein the inner member extends longitudinally a first distance and the outer member extends longitudinally a second distance that is greater than the first distance.

2. The vehicle system of claim 1, further comprising the bumper beam attached to a first end portion of the crush-can assembly, and the vehicle frame attached to a second end portion of the crush-can assembly, the first end portion opposite the second end portion.

3. The vehicle system of claim 2, further comprising a support plate of the crush-can assembly, the support plate additively fabricated, the support plate extending from the second end portion of the outer member, the support plate directly connected to the vehicle frame to attach the crush-can assembly to the vehicle frame.

4. The vehicle system of claim 3, further comprising mechanical fasteners that directly connect the support plate to the vehicle frame.

5. The vehicle system of claim 1, wherein the inner member and the outer member each have a circular axial cross-section.

6. The vehicle system of claim 1, further comprising a plurality of flanges of the crush-can, the plurality of flanges distributed circumferentially about a longitudinal axis of the crush-can, each of the flanges in the plurality of flanges extending radially from the inner member to the outer member.

7. The vehicle system of claim 1, wherein the inner member is a first inner member, and further comprising a second inner member of the crush-can assembly, the second inner member received within the first inner member.

8. The vehicle system of claim 7, wherein the second inner member extends longitudinally a distance less than the first inner member, wherein the first inner member extends longitudinally a distance less than the outer member.

9. A vehicle system, comprising:
a crush-can assembly having an inner member received within an outer member, the inner and outer members both additively fabricated, the outer and inner members configured to be positioned between a bumper beam and a vehicle frame; and
an additively fabricated lattice structure disposed between the inner member and the outer member.

10. A crush-can assembly providing method, comprising:
using an additive fabrication process to provide a crush-can assembly having an inner member received within an outer member, the outer and inner members configured to be positioned between a bumper beam and a vehicle frame; and
wherein the inner member extends longitudinally a first distance and the outer member extends longitudinally a second distance that is greater than the first distance.

11. The crush-can assembly providing method of claim 10, further comprising attaching a first end portion of the crush-can assembly to a bumper beam of a vehicle, and attaching a second end portion of the crush-can assembly to a vehicle frame of the vehicle.

12. The crush-can assembly providing method of claim 11, further comprising directly connecting a support plate that extends from the second end portion of the outer member to the vehicle frame to directly connect the crush-can assembly to the vehicle frame.

13. The crush-can assembly providing method of claim 12, wherein the support plate is additively fabricated together with the outer and inner members.

14. The crush-can assembly providing method of claim 10, providing a plurality of flanges of the crush-can, the plurality of flanges distributed circumferentially about a longitudinal axis of the crush-can, each of the flanges in the plurality of flanges extending radially from the inner member to the outer member, the plurality of flanges additively fabricated together with the inner and outer members.

15. The crush-can assembly providing method of claim 10, wherein the inner member and the outer member each have a circular axial cross-section.

16. The crush-can assembly providing method of claim 10, wherein the inner member is a first inner member, and further comprising a second inner member of the crush-can assembly, the second inner member received within the first inner member.

17. The crush-can assembly providing method of claim 16, wherein the second inner member extends longitudinally a distance less than the first inner member, wherein the first inner member extends longitudinally a distance less than the outer member.

18. The crush-can assembly providing method of claim 10, further comprising using the additive fabrication process to provide a lattice structure between the inner member and the outer member.

* * * * *